(12) United States Patent
Nordahl-Pedersen (10) Patent No.: US 10,729,110 B2
(45) Date of Patent: Aug. 4, 2020

(54) INSTALLATION AND METHOD FOR FARMING OF FISH

(71) Applicant: Geir Nordahl-Pedersen, Brattholmen (NO)

(72) Inventor: Geir Nordahl-Pedersen, Brattholmen (NO)

(*) Notice: Subject to any disclaimer, the term of this patent is extended or adjusted under 35 U.S.C. 154(b) by 190 days.

(21) Appl. No.: 16/091,991

(22) PCT Filed: Apr. 6, 2017

(86) PCT No.: PCT/NO2017/050081
§ 371 (c)(1),
(2) Date: Oct. 7, 2018

(87) PCT Pub. No.: WO2017/176125
PCT Pub. Date: Oct. 12, 2017

(65) Prior Publication Data
US 2019/0110447 A1    Apr. 18, 2019

(30) Foreign Application Priority Data

Apr. 7, 2016  (NO) .................................. 20160573
Jan. 9, 2017  (NO) .................................. 20170034

(51) Int. Cl.
| | | |
|---|---|---|
| *A01K 61/10* | (2017.01) | |
| *A01K 61/60* | (2017.01) | |
| *A01K 63/00* | (2017.01) | |
| *A01K 63/04* | (2006.01) | |

(52) U.S. Cl.
CPC .............. *A01K 61/10* (2017.01); *A01K 61/60* (2017.01); *A01K 63/00* (2013.01); *A01K 63/003* (2013.01); *A01K 63/045* (2013.01); *Y02A 40/826* (2018.01)

(58) Field of Classification Search
CPC ...... A01K 63/04; A01K 61/60; A01K 63/045; A01K 61/10; A01K 63/00; A01K 61/70
USPC ................................ 119/223, 227, 215, 226
See application file for complete search history.

(56) References Cited

U.S. PATENT DOCUMENTS

| | | | | |
|---|---|---|---|---|
| 1,393,339 | A * | 10/1921 | Benton | .................. A01K 61/10 |
| | | | | 119/224 |
| 3,495,572 | A | 2/1970 | Groves | |
| 4,116,164 | A * | 9/1978 | Shabi | .................. A01K 63/042 |
| | | | | 119/225 |
| 4,137,868 | A * | 2/1979 | Pryor | .................... A01K 61/54 |
| | | | | 119/212 |
| 4,798,168 | A | 1/1989 | Vadseth et al. | |
| 4,972,801 | A | 11/1990 | Hunt | |
| 5,193,481 | A | 3/1993 | Loverich et al. | |
| 8,925,489 | B2 * | 1/2015 | Hoie | ...................... A01K 61/60 |
| | | | | 119/223 |
| 2008/0029041 | A1 | 2/2008 | McRobert | |
| 2018/0177161 | A1 * | 6/2018 | Berge | ..................... A01K 61/13 |

(Continued)

FOREIGN PATENT DOCUMENTS

| | | |
|---|---|---|
| EP | 0574589 A1 | 12/1993 |
| GB | 1291991 A | 10/1972 |
| NO | 911075 | 9/1992 |

(Continued)

*Primary Examiner* — Yvonne R Abbott-Lewis
(74) *Attorney, Agent, or Firm* — Flener IP & Business Law; Zareefa B. Flener; Ayhan E. Mertogul (57) ABSTRACT

An installation for the farming of fish is described and also a method to establish a water reservoir for the farming of the fish.

15 Claims, 5 Drawing Sheets

(56) References Cited

U.S. PATENT DOCUMENTS

2019/0075765 A1* 3/2019 Swanson ................ B01D 33/11

FOREIGN PATENT DOCUMENTS

| NO | 175341 B | 1/1994 |
|----|----------|--------|
| NO | 20101803 A1 | 10/2011 |
| NO | 337333 B1 | 10/2015 |
| WO | WO1994002005 A1 | 2/1994 |
| WO | WO2011133045 A1 | 10/2011 |

* cited by examiner

INSTALLATION AND METHOD FOR FARMING OF FISH

AREA OF THE INVENTION

The present invention relates to an installation for farming of fish and a method for establishing a water reservoir for farming of fish.

BACKGROUND

Today, the farming of fish is a large and important industry. Traditionally, the farming takes place in sea-based installations, where the farming net cage has a seine of a given mesh size through which water flows freely.

The fish in these installations suffer from different diseases and salmon lice have lately been a great problem in connection with the farming of salmon. The lice get in through the net in the net cage installations. To avoid this problem of infection from pathogenic organisms (lice, algae, bacteria, virus, and so on) entering into the net cage, closed installations have been developed. Different land-based installations have been developed where the farming takes place in a tank on land and where fresh water is pumped from the sea and up into the installation. Furthermore, sea-based floating installations with watertight walls have also been developed. Such "watertight" walls are often made from a tarpaulin material, but they can also be of different moulded designs.

Such a farming net cage is described in the Norwegian patent NO332341, Ecomerden, and is a floating farming net cage with a double wall system, i.e. both a watertight outer wall and an internal seine. The net cage is fitted with a floating collar to ensure correct positioning when floating in the water and for the supply of fresh water to the net cage.

OBJECTS OF THE PRESENT INVENTION

It is an object of the present invention to safeguard the advantages that one can obtain with a land-based installation and combine these with the advantages one obtains with sea-based floating installations without incorporating the disadvantages that are associated with such installations.

Thus, it is an object of the invention to provide an installation that is closed, in the sense that the water reservoir in the farming net cage itself is surrounded by a closed wall against the water reservoir in which the net cage floats, and it is also an advantage, if not absolutely necessary, that the installation over the net cage installation has a roof construction.

It is a further object that the farming net cages float in an installation and thus get the advantages from sea-based installations such as that the water can be pumped up simply and energy efficiently to and from the farming net cage.

These objects are reached if one arranges the farming net cages in a separate basin, and where this basin is in further communication with an external water reservoir.

SUMMARY OF THE INVENTION

In a first aspect, the present invention relates to an installation for the farming of fish, characterised in that the installation is comprised of;
a basin with a water reservoir (B) that is separate with regard to, and in fluid communication with, an external water reservoir (C), where there are pipelines between the basin and the water reservoir (C) for the transfer of water to and from the basin, and
one or more farming net cages with a water reservoir (A) submerged and floating in the basin, where said farming net cages are arranged with a wall that is not water permeable.

In one embodiment the water surface in the basin and the water surface in the water reservoir (C) are at the same level, or the water level in the basin is set at a level between high tide and low tide for the water reservoir (C), providing the water reservoir (C) is the sea/ocean.

In one embodiment the installation sets up a double barrier with a basin wall and a net cage wall between the water reservoir (A) and water reservoir (C).

In one embodiment said net cage is comprised of a water permeable wall, such as a seine arranged on the inside of the wall.

In one embodiment the farming net cage is comprised of:
a floating appliance set up so that the net cage floats in the basin to establish the correct vertical positioning for the net cage in the basin.
a pipeline with an inlet opening for the supply of fresh water from the water reservoir (B) to the net cage,
an outlet in the lower part of the net cage for the removal of water and waste via a pipeline.

In one embodiment said line is sufficiently flexible to be regulated with changes in the water surface in the water reservoir (B).

In one embodiment the net cage is rigidly or flexibly arranged at the bottom of the basin set up so that the vertical positioning of the net cage with regard to the water line in the basin can be adjusted.

In one embodiment the net cage is rigidly or flexibly arranged in said roof or wall section of the basin, set up so that the vertical position of the net cage in relation to the water line in the basin can be adjusted.

In one embodiment the inlet opening for the supply of fresh water from the water reservoir (C) to the water reservoir (B) is arranged at a distance from the water surface, such that one prevents intake of pathogenic organisms such as lice into the water reservoir (B) where said distance is preferably at least 15 metres from the water surface.

In one embodiment the basin is arranged in a land formation in the vicinity of a water reservoir (C).

In one embodiment the water surfaces are at the same level.

In one embodiment the water reservoir (C) is the sea where the height difference and hydrostatic pressure in the water surface is used to drive the water out from and into the basin.

In one embodiment a cleaning filter for the cleaning of water to the water reservoir (A) and from the water reservoir (B) is arranged such that it goes up and down with the tidal water.

In one embodiment a wall section in the basin has a larger circumference so that the body of water in the basin at this layer is larger than for the rest of the basin.

In one embodiment a cleaning appliance is arranged to float in a further water reservoir (D), and water from this net cage is led through a pipeline to said cleaning appliance, and that cleaned water is led from the cleaning appliance to the water reservoir (C).

In one embodiment cleaned water is led from the cleaning appliance through a pipeline to the water reservoir (D).

In one embodiment cleaned water is led from the cleaning appliance directly to the water reservoir (C).

In one embodiment pipelines (30) for the transfer of water to and from the basin (20) are in the form of tunnels in a rock foundation.

In a second aspect the present invention relates to a method to establish a water reservoir (A) for the farming of fish, characterised in that one or more farming net cages are arranged to float in a water reservoir (B) in a basin, where said farming net cages are arranged with a wall that is not water permeable, where the water reservoir (B) in the basin is separate from an external water reservoir (C), and where the supply of water to the basin from the water reservoir (C) goes through a pipeline, and where the outflow of water from the net cage to the water reservoir (C) goes through a pipeline, and where the water surface in the basin is set up to be at the same level as the water surface in the water reservoir (C).

In one embodiment the water surface in the water reservoir (A) is arranged to be at the same level as, or higher than, the water surface in the water reservoir (B).

In one embodiment, provided that the water reservoir (C) is the sea/ocean, then the replacement of water between the water reservoirs (B) and (C) is completely or partially driven by the tidal difference for the water reservoir (C).

In one embodiment fresh water is supplied to the water reservoir (A) from the water reservoir (B).

In one embodiment, providing that one pumps water from the water reservoir (B) to the water reservoir (A) a corresponding amount of water that is pumped into the water reservoir (A) is replaced with water from the water reservoir (C) due to the hydrostatic difference or because one pumps a corresponding amount of water into the water reservoir (B).

DESCRIPTION OF THE FIGURES

Preferred embodiments of the invention shall, in the following, be described in more detail with reference to the enclosed figures, in which.

Figure 1:
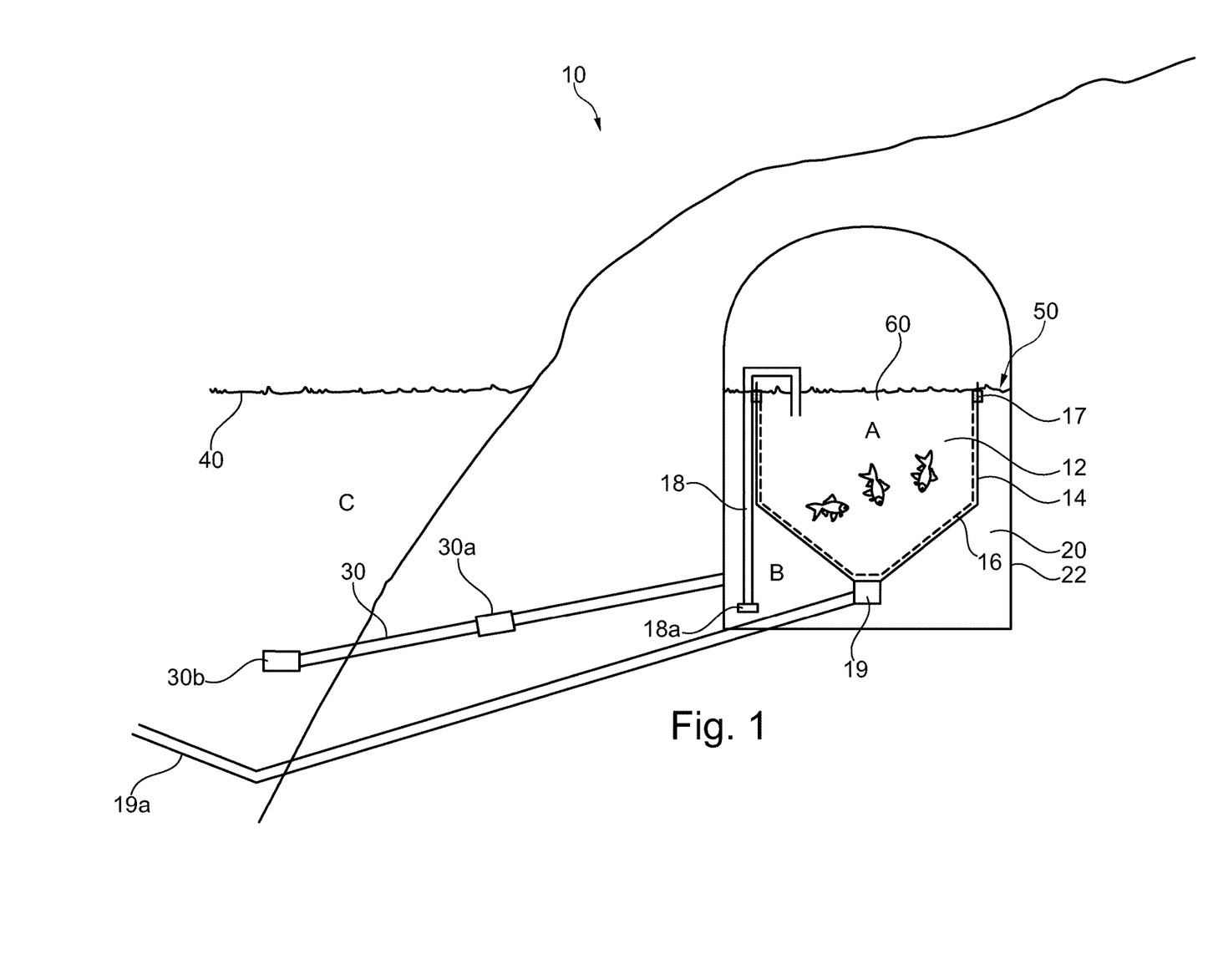
FIG. 1 shows schematically an installation with a farming net cage in a basin and where the installation is comprised of three different water reservoirs given as A, B and C. The figure also shows pipelines for the supply of water between these reservoirs.

FIG. 1 shows schematically a preferred embodiment of the invention, i.e. an installation 10 for the farming of fish. The drawing shows a farming net cage 12 that is placed in a basin 20, where it can be seen that the basin 20 is a separate unit but arranged in the vicinity of a larger water reservoir C such as the sea, a lake or a river.

As shown in FIG. 1, a solution according to the invention with three separate water reservoirs is established; in the first place a farming net cage 12 contains a separate first water reservoir, given as "A" in the FIG. 1 bordered by the at least one watertight cloth/wall 14 of the farming net cage 12. This cloth or wall 14 is impermeable to water and one therefore has control of the water and the water quality in this first water reservoir A.

The farming net cage 12 can be any type of floating watertight farming net cage and there are different models on the market that can be used. The farming net cage 12 can be/is fitted with buoyancy means such as, for example, a floating collar 17 to give it the correct and suitable vertical positioning in the basin 20, and such that it floats in the basin. In alternative embodiments the farming net cage 12 is rigidly or flexibly secured to the bottom or roof section of the basin 20. For example, the net cage 12 can be suspended from the roof or from an arrangement with fastenings to the walls of the basin 20. It is preferred that the vertical positioning of the net cage 12 with regards to the waterline can be adjusted, and in such cases a floating collar 17 can be superfluous. In other embodiments, the net cage 12 is rigidly or flexibly secured to the bottom section, possibly in that the net cage 12 is fastened to a framework at the bottom of the basin 20. These solutions are not shown in the figures.

The basin 20 can be any kind of construction, but is typically an artificial construction such as a larger building or a tunnel arrangement in a rock foundation. The basin 20 has watertight walls 22 that can contain a water reservoir. The water reservoir in the basin 20 is given as "B" in FIG. 1 and is also described as a second water reservoir. Thus, the farming net cage 12 floats in the water reservoir B in the basin 20.

The farming net cage 12 and the basin 20 are both "closed" with watertight walls, 14 and 22 respectively, in that the walls in both the net cage 12 and basin 20 are impermeable for a liquid. Meant by "walls" 14, 22 is, in this context, both the bottom and the wall sections. The net cage 12 can have any shape, but has a general U-like shape with walls (wall and bottom sections) and an open, upwardly facing section. In this way a double barrier (double wall) 14, 22 is formed between the first water reservoir A in the net cage 12 and the external water reservoir C which will give very good protection to prevent pathogenic microorganisms from entering the installation and preventing fish in the net cage from escaping from the installation. All the fresh water that is supplied to the farming net cage 12 is collected via the pipeline 18 in the water reservoir B. The water reservoir B is supplied with water from the water reservoir C, and the inlet 30b in this pipeline is arranged at a sufficient depth below the water surface 40 so that one does not get an inflow of pathogenic organisms. One can also arrange an inlet pipe for fresh water to the water reservoir A directly from the external water reservoir C (not shown in the figures), so that one, in certain situations, can collect fresh water from the external water reservoir C, but this is a less preferred solution and is only used in special circumstances. For the time being, parasites such as lice represent a great problem in the farming of salmon and if one collects the fresh water from a depth of more than about 15 metres, one will avoid lice. Normally salmon lice do not live at water depths of below 10-15 metres. The inlet 18a is also fitted with a filter for the filtration of the water, and by selecting the right cut-off for the filter one can prevent those organisms above a certain size from entering the net cage 12. The vertical positioning of the inlet 30 can preferably be regulated so that water can be collected from any wanted and adapted depth in the water reservoir C.

In a presently preferred embodiment, the net cages 12 have a vertical extension of about 30 metres. Thus, it is also preferred that the basin 20 has a depth (distance from the waterline to the bottom) of around 35 to 40 metres.

The basin 20 is arranged in the vicinity of an external water reservoir, given as "C" in FIG. 1. This external water reservoir C can be the sea, a lake, or a river. The basin 20 is in fluid communication with the water reservoir C via the pipeline 30 for the supply of water to the basin 20, and the pipeline 19a for the release of water from the net cage 12 to the water reservoir C. The pipelines can be fitted with pumps/valves/filters 30a. It is preferred that water which is supplied via the pipeline 30 to the basin 20 is collected from a sufficient depth such that it is free from pathogenic organisms such as salmon lice, and the pipeline 30 can be fitted with a filter/grid 30b at the inlet. In a preferred embodiment the fluid communication is established between the water reservoirs B and C via tunnels in the formation (not shown in the figures).

The installation 10 shown schematically in FIG. 1 will be comprised of one or more farming net cages 12. Typically, the installation 10 will be comprised of a large number of farming net cages 12.

Each of the farming net cages has representative values as follows:

Volume (correspond to water reservoir A) 5000 m³.
Height: 30 m.
Fish density (salmon); 80 kg/m³, total 400 tonnes
Water changes in the net cage: 0.2-0.3 l/kg/min, in total 100 m³/min
Growth rate: 0.22 kg/m³/24 hours, in total 1100 kg/24 hours
Feed factor: 1.15
Feed consumption: 1260 kg/24 hours
Oxygen consumption: 0.25 kg/kg feed, in total 470 kg/24 hours
$CO_2$ production: 0.4 kg/kg feed, in total 740 kg/24 hours A considerable circulation of water in the net cage 12 is required to keep the water fresh and in movement. Oxygen can be added to the water that is circulated between the basin 20 and the net cage 12 before it enters the net cage 12 so that the oxygen level is always sufficient to ensure good fish health. The supply of oxygen can, for example, be via the pipeline 18 (means for the supply of oxygen is not shown in any detail). The water that is removed via the pipeline 19a can be cleaned before it is taken back to the water reservoir C.

Figure 6:
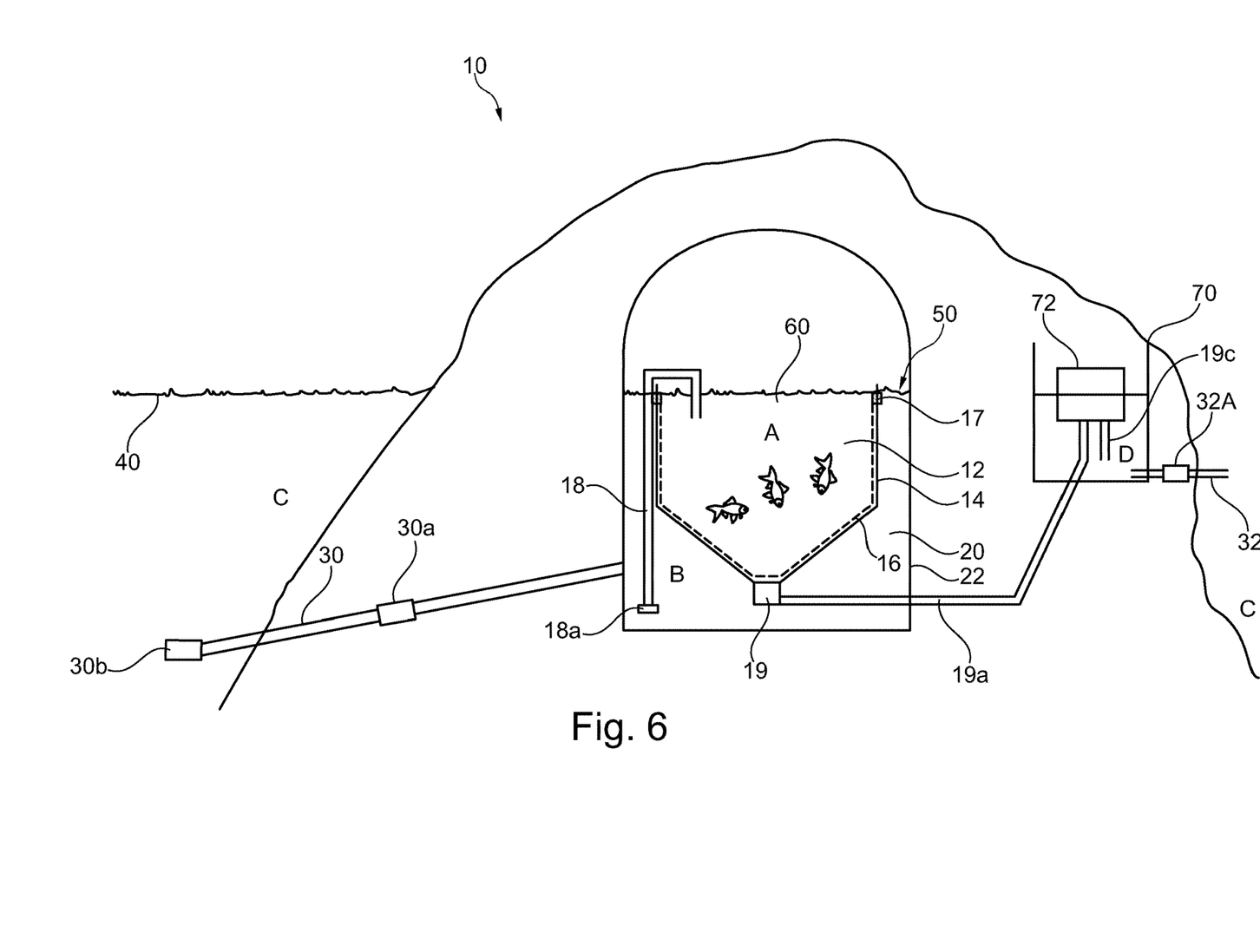
FIG. 6 shows an alternative embodiment of the installation which also comprises a water reservoir D with a floating treatment appliance.

In an alternative preferred embodiment, shown in FIG. 6, the installation comprises a further water reservoir D, and in this a cleaning plant 72 is located, which can be floating. Water from the net cage 12 is taken out via the pipeline 19a and into the cleaning plant 72 and clean water is led from the treatment plant 72 via the pipeline 19c and out into the water reservoir D, and thereafter from the water reservoir D to the water reservoir C via the pipeline 32. Alternatively, cleaned water can be led directly from the cleaning plant 72 to the water reservoir C (not shown in the figure). It is preferred that the inlet (30) and outlet (32) of water from and to the water reservoir C are arranged sufficiently apart so that a fire gate (farm-free zone) is set up, that is a barrier where infectious materials are diluted, sunk or reduced in their biological activity.

For a floating farming net cage 12, i.e. where the water surface in the net cage 12 is at the same level as the surrounding sea, it is necessary to have a pumping effect of about 20 kW to pump water into and out of the net cage 12.

For an installation on land, i.e. at a certain height above the water surface (for example, the sea) the minimum lifting height is 30 m if one shall pump the water to the top of the net cage. This corresponds to a pump effect of about 750 kW, this corresponds to 16 kW*hour/kg fish and an annual consumption per net cage of 6.6 GW*hour. This leads to a considerable cost and is not sustainable, and is therefore a considerable disadvantage for a land-based installation.

With the solution that is shown in FIG. 1, the water surface 60 for the water reservoir A in the net cage 12 is set up to be at the same level as the water surface 50 in the basin 20 and one achieves the same low demands for pumping effect as for a floating net cage even if the net cage is placed in a rigid construction that can be on land. Therefore, one gets a closed land-based installation with the same low requirements for energy consumption as for a floating sea-based closed installation.

$CO_2$ and other metabolites secreted by the farmed fish will accumulate in the net cage 12 and the water must therefore be replaced.

In FIG. 1 it can be seen that the water surface 50 in the water reservoir B in the basin 20 is set at the approximately same level as the water surface 40 in the external water reservoir C (for example, the sea). Thereby, the water can be pumped between the water reservoirs B and C at a low energy consumption if this is necessary. This is an essential advantage with this embodiment of the invention. The hydrostatic pressure and tidal differences can influence the flow between the water reservoirs B and C, without pumping (but with filtration) at the inlet of water to the water reservoir B. As one pumps water into the first water reservoir A from a second water reservoir B, the water reservoir B will be emptied of water all the time. A corresponding amount of water that is led into the water reservoir A will be replaced by water from a third water reservoir C because of the hydrostatic pressure (if the cross-section area of the pipeline/tunnel is large enough) or because one pumps water into the water reservoir B.

If the water reservoir C is the sea/ocean, the water surface 40 will raise and lower with the tide. This change in the level of the water surface 40 can be used to drive the water from the water reservoirs C to B (at high tide) and also the opposite way (at low tide). If the basin 20 is connected to a water reservoir C by the tidal water, one will achieve a considerable natural exchange and this natural exchange does not require any energy for the pumping of the water. The exchange of water between the reservoirs B and C can take place via dedicated channels in the rock formation (not shown), or via a pipeline tunnel 30. As the basin 20 and the water reservoir C have a water surface 40, 50 at the same level, the necessary pumping effect will be small in any case.

When water is pumped via the pipeline 18 to the net cage 12, the water level 60 in the net cage 12 will rise and a higher water level 60 in the net cage 12 than in the water reservoir B will drive water out of the net cage 12 through the pipeline 19a.

Figure 2:
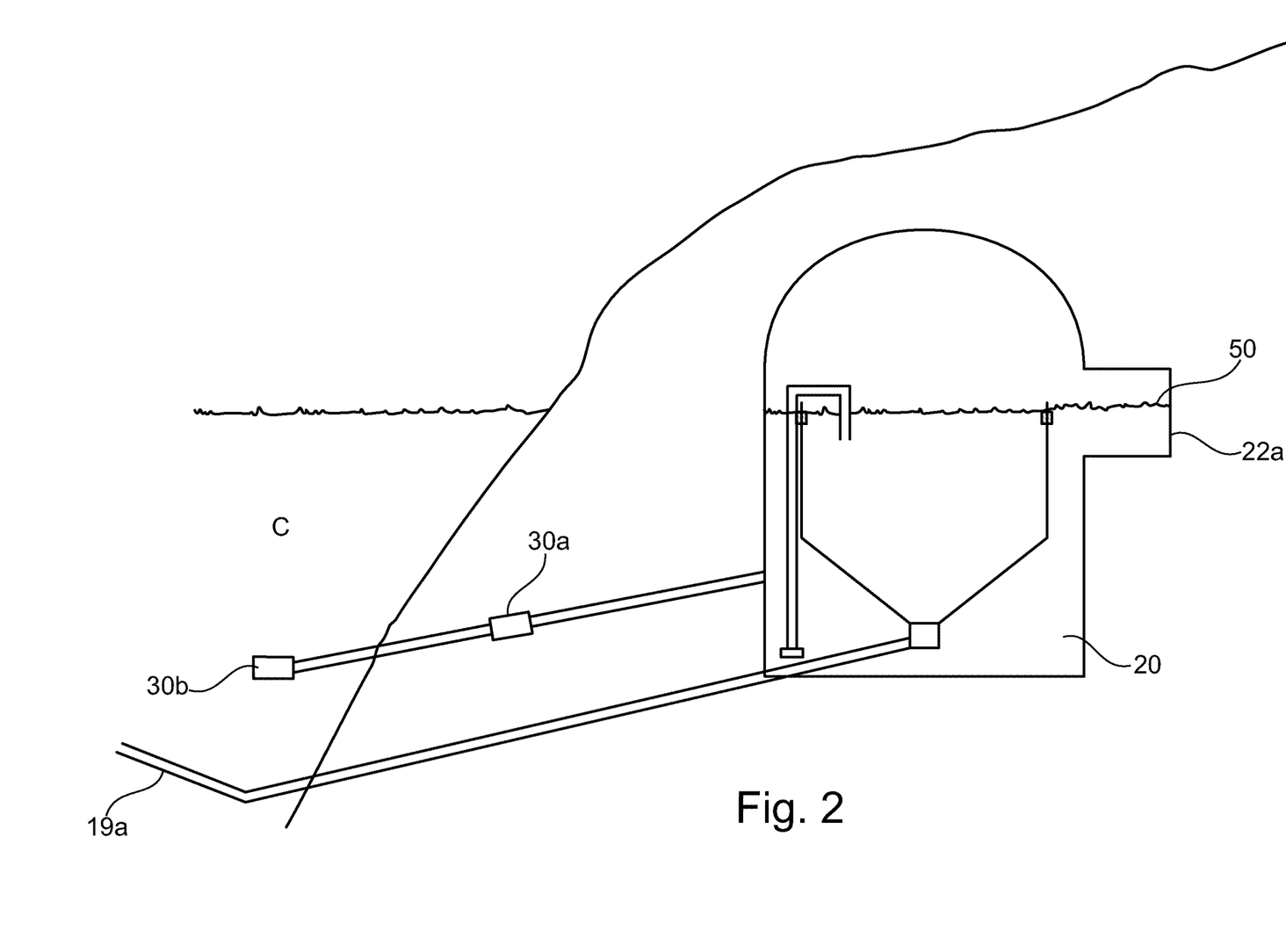
FIG. 2 shows an alternative embodiment of a basin according to the invention where the circumference and volume of the basin is increased in an area around the level of the water surface.

FIG. 2 shows an embodiment of the basin 20 which has a circumference 50 above and below the water surface that is larger than the general circumference of the basin 20, so that the water volume in the basin 20 is larger in level of the tidal changes for the water reservoir C. This will increase the effect that the tidal water has in the replacement of water in the basin 20.

Figure 3:
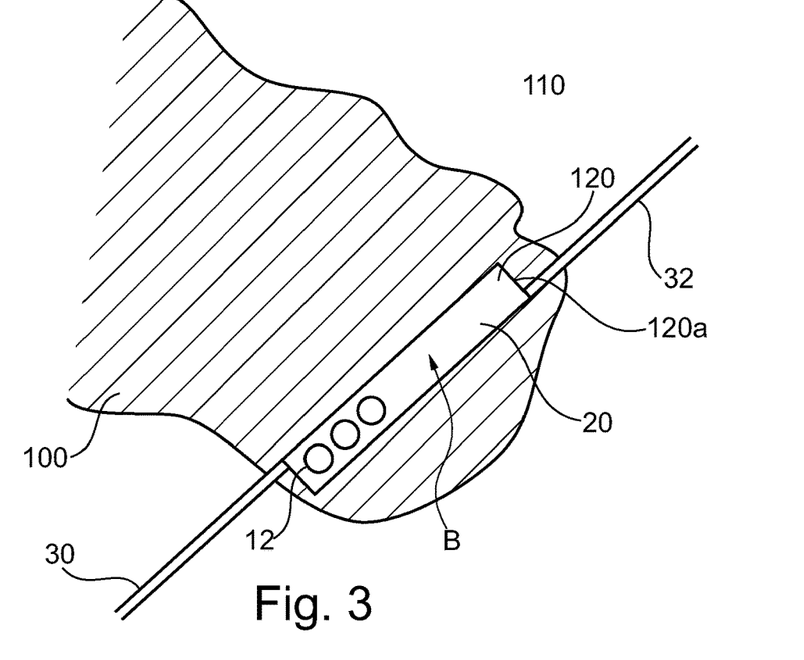
FIG. 3 shows schematically simplified, seen from above, a preferred embodiment of an installation according to the invention that is arranged in a land formation bordering onto the water (the sea), and where the basin is separated from the sea and a separate water reservoir B is established.
Figure 4:
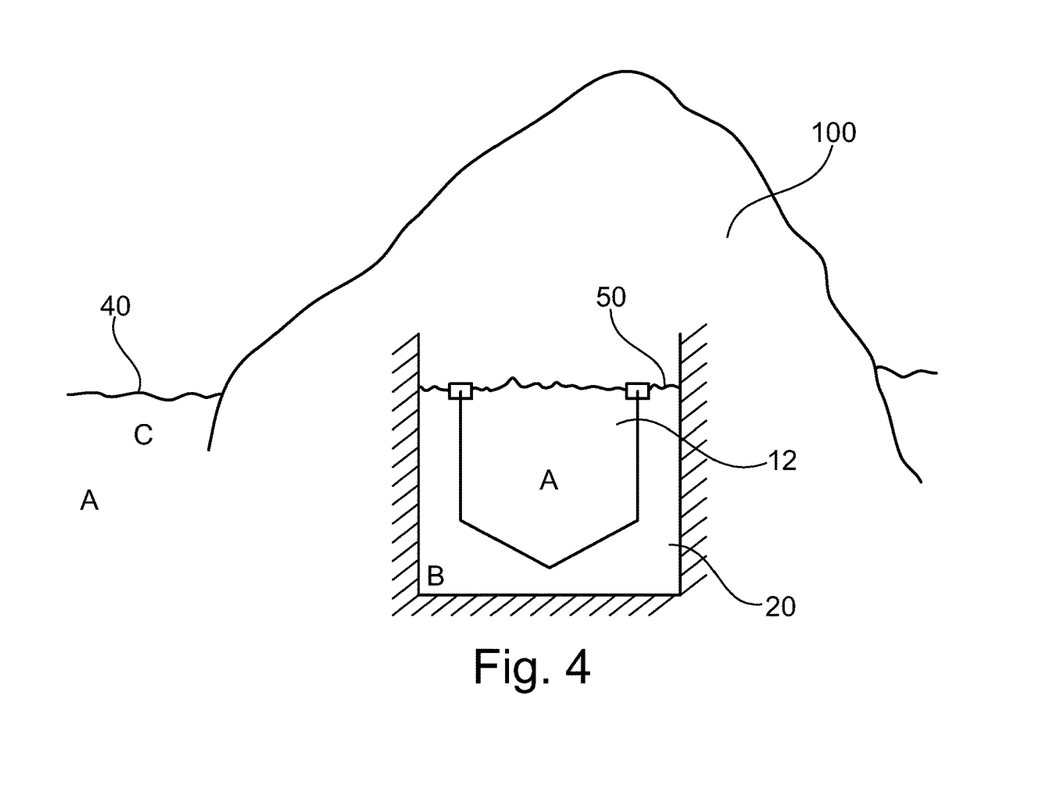
FIG. 4 shows the same installation as FIG. 3, but seen in a cross section where the water surfaces of the water reservoir B and the external water reservoir C are shown to be at the same level.
Figure 5:
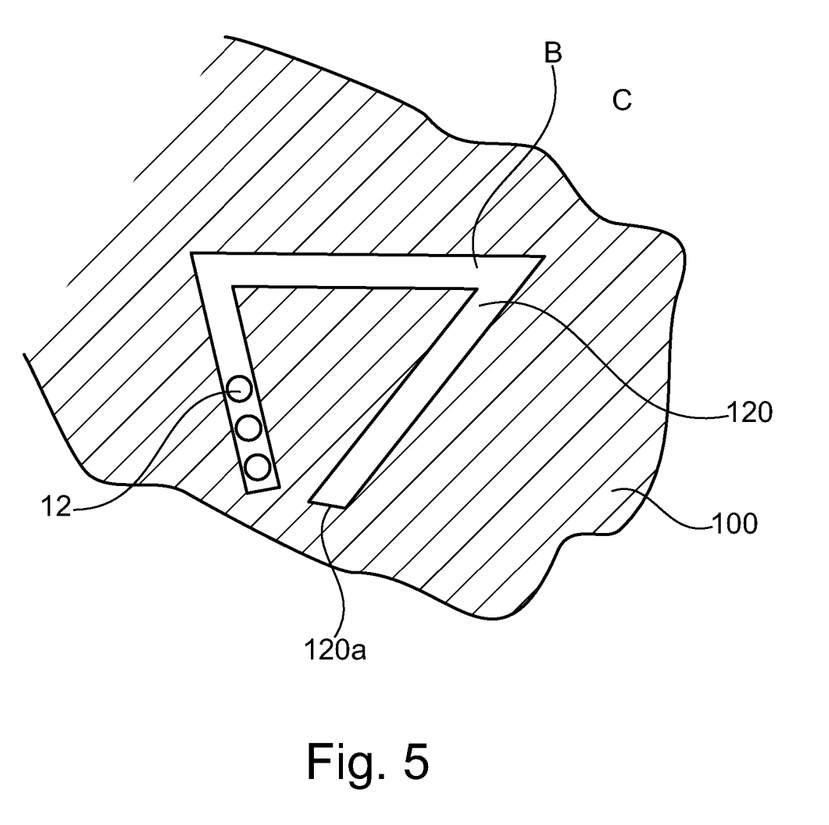
FIG. 5 shows an alternative embodiment of the basin, where the extended end sections of the basin are close to each other and close to, but separate from the surrounding external water reservoir C.

A presently preferred embodiment of the invention uses tunnels in the rock formations to establish the basin 20. This is shown schematically in FIG. 3 which shows (horizontal section seen from above) a land formation such as an island or a headland 100, in an external water reservoir C, such as the sea 110. A longitudinal canal 120 is blasted or bored out. The end sections 120a are watertight (either not blasted out, or made tight again) so that a basin 20 with a water reservoir B is established in the canal 120. A number of farming net cages 12 are placed floating in the basin 20. FIG. 4 shows, in section, the same solution as in FIG. 3, where it can be seen how the basin 20 and net cage 12 and the water surface 50 in the basin 20 are arranged in relation to the external water surface 40. The basin 20 that is established in the formation 100 can have any shape and size. For example, if there is a longitudinal canal, the end sections 120a can be near each other, as shown in FIG. 5.

The farming net cages that are arranged floating in the basin 20 have one watertight wall. Meant by watertight wall 14 here is that the whole of the form (wall and bottom section) of the net cage is impermeable to water.

It is preferred that pumping of water from the water reservoir B to the water reservoir A establishes circular streams in the net cage 12 and this leads to all solid particles being forced towards the outer edge of the net cage 12 and falling down in the outer edge of the net cage 12 and being forced down to the middle of the bottom of the net cage 12 in the water reservoir A so that these can easily be separated out by a suitable cleaning pipe. If one splits the outlet 19 in the bottom of the net cage 12 one can get a more effective cleaning of the water. If sludge and feed residues are separated out before they dissolve in the water one will only need to clean a considerably smaller amount of water than if one lets them dissolve before one cleans the sludge and feed residues. In a preferred embodiment, the pipeline 19a takes 90-99% of all the water out of the net cage 12. This can go uncleaned to the water reservoir D, possibly water reservoir C. The water that comes from the effluent line 19a can be cleaned in a simpler way as this water does not contain solid material (feed residues and sludge). The net cage 12 can also be fitted with a further pipeline (not shown in the figure) out of the net cage for the separation of feed residues and sludge. This pipeline is located at the bottom of the net cage 12 and placed so that, and preferably fitted with a pump (not shown in detail), it will suck up the sludge and the feed residues. Furthermore, it is preferred that this water pipe/pump shall take 1-10% of the water out of the net cage 12. The water from this pipeline is cleaned in a conventional way, such as with a cleaning filtration system, UV light and/or mechanical cleaning in the water reservoir D.

Water via the water inlet 30 is preferably led into the water reservoir B via a shaft which is established to break the speed of the water flow. Large amounts of water are required into the water reservoir B to ensure sufficient water supply to the net cages 12. The diameter of the pipeline can be larger when the inlet line 30 comes near the water reservoir B such that the speed of the water flow is reduced toward the end of the pipe/tunnel 30. It can also be required to split the water flow so that one can distribute the water supply over the whole of the water reservoir B so that there is more even/reduced flow in the water reservoir B. The pipeline 30 can also be fitted with barriers in the opening to the water reservoir B such that the speed of the water flow is reduced. This is different than in the traditional net cages (which are water permeable) where one wants a high flow speed so that one gets sufficient water throughflow in the net cage. In the installation according to the present invention one will limit the speed of the water flow to be able to hold the shape of the net cage 12 if this is flexible.

The topography will be determining for how one can organise the inlet for water 30b and outlet 32 for water. Optimal design will be to be able to have an inflow of water 30b at one side of the terrain and let the water out at the other side of the terrain where the water distance between inlet 30b and outlet 32 is a large as possible. Other solutions can be to collect water from the water reservoir C in to the water reservoir B at a depth which means one avoids pathogenic organisms and the outlet point is high in the surface or lower than the inlet to avoid, as much as possible, that one uses the same water twice. This decision will be dependent on the flow conditions/flow speeds and it must be worked out for every individual location. It is also a possibility that one places the inlet 30b and the outlet 32 far away from each other via pipelines so that one does not use the "same" water twice. If the distance is large enough this will function as a firebreak (farming free zone), i.e. a barrier where infectious materials are diluted, sunk or have their biological activity reduced. The water quality in the farming body of water is also, to a large extent, dependent on whether the waste materials from the farming fish are removed. If the distance between the inlet 30b and the outlet 32 is large, these materials will be diluted in the water reservoir C (the sea, lake, river etc.) and one can thereby have a larger production of farmed fish at the same location.

Today, regulations limit the size of the biomass one can have at each individual location, and also the distance between different locations. This is because of the danger of infection, and also other environmentally threatening releases to the nearby environment. If one, in an imagined situation, had a disease problem in net cage 12 in the installation 10 it is only the farmed fish in the net cage 12 that will be infected. If one had taken the water back to the water reservoir B, all the farmed fish in the installation 10 would be infected. By using several water reservoirs A (more net cages 12) in the water reservoir B, will this invention make it possible to be able to operate a much greater production of farmed fish at the same location where one can more than double today's permitted biomass per location.

A preferred method for release of water from the water reservoir A to the water reservoir C takes place in that one goes via a water reservoir D which is connected to a cleaning plant for solid material and/or water.

The water surfaces in the water reservoirs B and D are driven by the sea from and to the water reservoir C with the help of the high and low tides. Water to the water reservoir A must be pumped/ejected from the water reservoir B, and one can, by pumping to a higher water surface in the water reservoir A, move the water from the water reservoir A to the water reservoir D and thereafter the water will flow unhindered from the water reservoir D to the water reservoir C. Pumping from the water reservoir B to the water reservoir A will promote a larger throughflow of water in the water reservoir B. The water from the water reservoir A can also be pumped out via the pipeline 19 by the help of a pump, ejector systems, propeller and/or compressed air so that one gets the same height in the water reservoirs A, B, C and D. By using only pumping power from the water reservoir B to the water reservoir A, one will reduce the energy costs significantly. Then, it is only necessary to pump once if the water surface in the water reservoir A is higher than in the water reservoirs B and D.

From the water reservoir C to the water reservoir B the water can be used uncleaned or cleaned by the help of filtration systems, UV light and/or mechanical cleaning. From the water reservoir B to the water reservoir A, the water can be cleaned with the help of filtration systems, UV light and/or mechanical cleaning. From the water reservoir A to the water reservoir C, the water can go uncleaned or cleaned with the help of filtration systems, UV light and/or mechanical cleaning. From the water reservoir A, the water can go completely or partially uncleaned to the water reservoir D and be cleaned in or at the water reservoir D with the help of filtration systems, UV light and/or mechanical cleaning.

Surface growth may happen in the water reservoir B. This can be reduced by keeping the water in the water reservoir B, wall 22 and the outside of the net cage wall 14 from light, which is possible with the help of a light impermeable cloth over the water or by the help of a building/tunnel over the water reservoir B.

By collecting water from the same depth one will have the same water temperature in the water reservoirs A and B as the inlet depth from the water reservoir. The water temperature in the water reservoir C will vary with the depth. For example, the temperature at the surface can be 14° C. compared with, for example, 9° C. at 70 metres. It is an advantage to have the same temperature throughout the net cage with regard to feeding, growth and fish welfare.

The invention claimed is:

1. Installation for the farming of fish, wherein the installation comprises:
   one or more farming net cages (12) each forming a first water reservoir (A) submersed and floating in a basin (20), where said farming net cages (12) are arranged with a wall (14) that is not water permeable,
   the basin (20) forming a second water reservoir (B) that is separate with regard to, and in fluid communication with, an external third water reservoir (C), wherein first pipelines (30) run between the basin (20) and the third water reservoir (C) for the transfer of water to and from the basin (20), and
   wherein a second pipeline (19a) runs between each net cage (12) and the third water reservoir C for the release of water from each net cage (12) to the third water reservoir (C);
   wherein the third water reservoir (C) is the sea or ocean, wherein the installation is arranged such that a first water surface (50) in the basin (20) and a second water surface (40) in the third water reservoir (C) are set at approximately the same level; and wherein
   the installation is further arranged such that the change of water between the second water reservoir (B) and third water reservoir (C) is completely or partially driven by the tidal differences for the third water reservoir (C).

2. Installation according to claim 1, wherein the installation sets up a double barrier between the first water reservoir (A) and the third water reservoir (C) with a basin wall (22) and the wall (14).

3. Installation according to claim 1, wherein said net cage (12) also comprises a water permeable wall (16), such as a seine arranged on the inside of the wall (14).

4. Installation according to claim 1, wherein the farming net cage (12) is comprised of,
   a floating device (17) set up so that the net cage (12) floats in the basin (20) and establishes the right vertical position for the net cage (12) in the basin (20),
   a third pipeline (18) with a first inlet opening (18a) for the supply of fresh water from the water reservoir (B) to the net cage (12), and
   an outlet (19) at the lower part of the net cage (12) for the outflow of water and waste materials via the second pipeline (19a) for the release of water to the third water reservoir (C).

5. Installation according to claim 4, wherein the second pipeline (19a) for the outflow of water from the net cage (12) is sufficiently flexible to be regulated with changes in the first water surface (50) in the second water reservoir (B).

6. Installation according to claim 4, wherein a second inlet opening (30b) for the inlet of fresh water from the water reservoir (C), which is sea or ocean, to the second water reservoir (B) is placed at a distance from the first water surface (50) so that one prevents the intake of pathogenic organisms such as lice to the second water reservoir (B), where said distance is at least 15 meters from the second water surface (40).

7. Installation according to claim 1, wherein the net cage (12) is rigidly or flexibly arranged at the bottom of the basin (20), set up so that the vertical positioning of the net cage (12) with regard to the waterline in the basin (20) can be adjusted, or the net cage (12) is rigidly or flexibly arranged in the roof or wall section of said basin (20), set up so that the vertical positioning of the net cage (12) with regard to the waterline in the basin (20) can be adjusted.

8. Installation according to claim 1, wherein the first water surface (50), the second water surface (40), and a third water surface (60) in the first reservoir (A) are at the same level.

9. Installation according to claim 1, wherein the third water reservoir (C) is the sea and where the height difference and hydrostatic pressure in the second water surface (40) is used to drive water out of and into the basin (20).

10. Installation according to claim 1 wherein a cleaning filter for the cleaning of water to the first water reservoir (A) and from the second water reservoir (B) is arranged so that the cleaning filter rises and falls with the tide of the third water reservoir (C) which is sea or ocean.

11. Installation according to claim 1, wherein a wall section (22a) in the basin (20) has a larger circumference such that the volume of water in the basin (20) at this layer is greater than for the rest of the basin (20).

12. Installation according to claim 1, wherein a cleaning plant (72) is arranged floating in a further water reservoir (D), and that water from the net cage (12) is led through the second pipeline (19a) to said cleaning plant (72).

13. Installation according to claim 1, wherein the first pipelines (30) for the transfer of water to and from the basin (20) are in the form of tunnels in a rock formation.

14. Method to establish a first water reservoir (A) for the farming of fish, wherein one or more farming net cages (12) with said first water reservoir (A) are arranged floating in a second water reservoir (B) in a basin (20), where said farming net cages (12) are arranged with a wall (14) that is not water permeable, where the second water reservoir (B) in the basin (20) is separate from an external third water reservoir (C), and where the supply of water to the basin (20) from the third water reservoir (C) takes place through a first pipeline (30) and where the outflow of water from the net cage (12) to the third water reservoir (C) takes place through a second pipeline (19a) and where a first water surface (50) of the basin (20) is set up to be at approximately the same level as a second water surface (40) in the third water reservoir (C), wherein the third water reservoir (C) is the sea or ocean, and wherein the change of water between the second water reservoir (B) and third water reservoir (C) is completely or partially being driven by the tidal differences for the third water reservoir (C).

15. Method according to claim 14, wherein fresh water is supplied to the first water reservoir (A) from the second water reservoir (B).

* * * * *